(12) United States Patent
Styles et al.

(10) Patent No.: US 7,730,451 B2
(45) Date of Patent: Jun. 1, 2010

(54) SOURCE SERVER

(75) Inventors: Pat Styles, Seattle, WA (US); Scott A. Kupec, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1184 days.

(21) Appl. No.: 10/747,659

(22) Filed: Dec. 26, 2003

(65) Prior Publication Data

US 2005/0144599 A1      Jun. 30, 2005

(51) Int. Cl.
G06F 9/44      (2006.01)
G06F 9/45      (2006.01)
G06F 17/30     (2006.01)

(52) U.S. Cl. .................... 717/124; 717/115; 717/140; 707/1; 707/3

(58) Field of Classification Search ......... 717/124–127, 717/140
See application file for complete search history.

(56) References Cited

U.S. PATENT DOCUMENTS

| | | | | |
|---|---|---|---|---|
| 4,295,206 A | * | 10/1981 | Cain et al. | 707/7 |
| 4,462,077 A | * | 7/1984 | York | 714/45 |
| 4,558,413 A | * | 12/1985 | Schmidt et al. | 707/203 |
| 5,778,231 A | * | 7/1998 | van Hoff et al. | 717/143 |
| 5,815,653 A | * | 9/1998 | You et al. | 714/38 |
| 5,870,464 A | * | 2/1999 | Brewster et al. | 379/219 |
| 5,978,586 A | * | 11/1999 | Baisley et al. | 717/158 |
| 5,978,587 A | * | 11/1999 | Baisley et al. | 717/144 |
| 6,106,574 A | * | 8/2000 | Baisley et al. | 717/140 |
| 6,202,199 B1 | * | 3/2001 | Wygodny et al. | 717/125 |
| 6,263,456 B1 | * | 7/2001 | Boxall et al. | 714/31 |
| 6,282,701 B1 | * | 8/2001 | Wygodny et al. | 717/125 |
| 6,539,538 B1 | * | 3/2003 | Brewster et al. | 717/115 |
| 6,571,285 B1 | * | 5/2003 | Groath et al. | 709/223 |
| 6,578,195 B1 | * | 6/2003 | Zaringhalam | 717/140 |
| 6,757,893 B1 | * | 6/2004 | Haikin | 717/170 |
| 6,795,962 B1 | * | 9/2004 | Hanson | 717/129 |
| 6,795,963 B1 | * | 9/2004 | Andersen et al. | 717/130 |
| 6,948,170 B2 | * | 9/2005 | Izumi | 718/100 |
| 6,961,731 B2 | * | 11/2005 | Holbrook | 707/102 |
| 6,964,036 B2 | * | 11/2005 | Bates et al. | 717/125 |
| 6,988,263 B1 | * | 1/2006 | Hussain et al. | 717/128 |

(Continued)

OTHER PUBLICATIONS

Stallman et al., "Debugging with GDB", Jan. 1994, retrieved from <http://docs.freebsd.org/info/gdb/gdb.pdf>, pp. 1-202.*

(Continued)

*Primary Examiner*—Tuan Q Dam
*Assistant Examiner*—Marina Lee
(74) *Attorney, Agent, or Firm*—Workman Nydegger

(57) ABSTRACT

A method and system for accessing at debug time the source code used to create a binary. During or shortly after compilation, an extractor extracts the names of source code files used to create the binary, communicates with a version control server to obtain information that identifies the versions of source code files used to create the binary, and stores the information in the binary or in a file associated with the binary. At debug time, the information is retrieved and used to obtain copies of the source code files from the version control server. The copies of the source code files are placed in a directory where the debugger expects to find them. The debugger may then show the source code corresponding to the binary instructions of the binary during debugging.

17 Claims, 5 Drawing Sheets

U.S. PATENT DOCUMENTS

| | | | |
|---|---|---|---|
| 7,055,136 B2 * | 5/2006 | Dzoba et al. | 717/125 |
| 7,062,750 B2 * | 6/2006 | Whidby et al. | 717/103 |
| 7,203,927 B2 * | 4/2007 | Al-Azzawe et al. | 717/124 |
| 7,231,633 B2 * | 6/2007 | Grassens | 717/124 |
| 7,584,283 B2 * | 9/2009 | Ra et al. | 709/227 |
| 2002/0087949 A1 * | 7/2002 | Golender et al. | 717/124 |
| 2002/0152222 A1 * | 10/2002 | Holbrook | 707/104.1 |
| 2003/0088854 A1 * | 5/2003 | Wygodny et al. | 717/130 |
| 2003/0167423 A1 * | 9/2003 | Murakami et al. | 714/38 |
| 2004/0078688 A1 * | 4/2004 | Pouyollon | 714/38 |
| 2004/0230954 A1 * | 11/2004 | Dandoy | 717/124 |

OTHER PUBLICATIONS

"Installing Debugging Tools", Mar. 28, 2003, Retrieved from <http://technet.microsoft.com/en-us/library/cc740105(WS.10,printer).aspx>, pp. 1-4.*

"Microsoft Source Server", Oct. 2007, retrieved from <crashopensource.files.wordpress.com/2007/10/srcsrv.doc -> pp. 1-18.*

"Source Server", Jan. 22, 2020, retrieved from <http://msdn.microsoft.com/en-us/library/ms680641(VS.85).aspx> pp. 1-6.*

"The Windows 2000 Indexing Service", Published date: Apr. 19, 2002, retrieved from <http://www.xefteri.com/articles/show.cfm?id=2> pp. 1-32.*

* cited by examiner

SOURCE SERVER

FIELD OF THE INVENTION

The present invention relates generally to computing devices, and more particularly to software development.

BACKGROUND

Software development is an iterative process. Typically, a software application or extension thereof is designed, coded, and debugged. The code corresponding to a software application includes both the code that the computer uses when executing an application (sometimes referred to as binary or executable code) and the code used to create the executable code (sometimes referred to as source code). Source code is typically written by a software developer and is intended to be human-readable. Executable code, on the other hand, typically comprises a string of "1's" and "0's" that form instructions that the computer can readily execute.

Typically, executable code is created by a special program called a compiler. The compiler examines the source code and creates executable code that the computer can more readily execute. During the compiling process, information contained in the source code such as comments, variable names, function names, and the like may be removed or replaced with other names for compactness, speed, and privacy of the source code.

After an application has been compiled, a debugger may be used by a software developer to step through the code in order to locate logical errors, security problems, performance issues, and the like. When source code is available that matches an application that is being debugged, the debugger can show the software developer what line or lines in the source code correspond to the instruction that will be executed in the currently debugged application.

During the development process, the code that makes up a software application—both source code and binary code—is in a constant state of change. Binary files may be placed in storage far removed from the source code used to create them. Source code may be changed without recompiling a binary. These factors and others may cause serious problems at debug time as the source code may no longer be available or match the binary that is being debugged.

What is needed is a method and system for locating and using, at debug time, the source code used to create a binary. Ideally, such a method and system would work seamlessly with a debugger and compiler and allow a software developer to focus on developing and debugging software rather than trying to match binaries to source code.

SUMMARY

Briefly, the present invention provides a method and system for accessing at debug time the source code used to create a binary. During or shortly after compilation, an extractor extracts the names of source code files used to create the binary, communicates with a version control server to obtain information that identifies the versions of source code files used to create the binary, and stores the information in the binary or in a file associated with the binary. At debug time, the information is retrieved and used to obtain copies of the source code files from the version control server. The copies of the source code files are placed in a directory where the debugger expects to find them. The debugger may then show the source code corresponding to the binary instructions of the binary during debugging.

As used in this document, a version may refer to a number or value indicating a version number of a file and/or a Other advantages will become apparent from the following detailed description when taken in conjunction with the drawings, in which:

DETAILED DESCRIPTION

Exemplary Operating Environment

Figure 1:
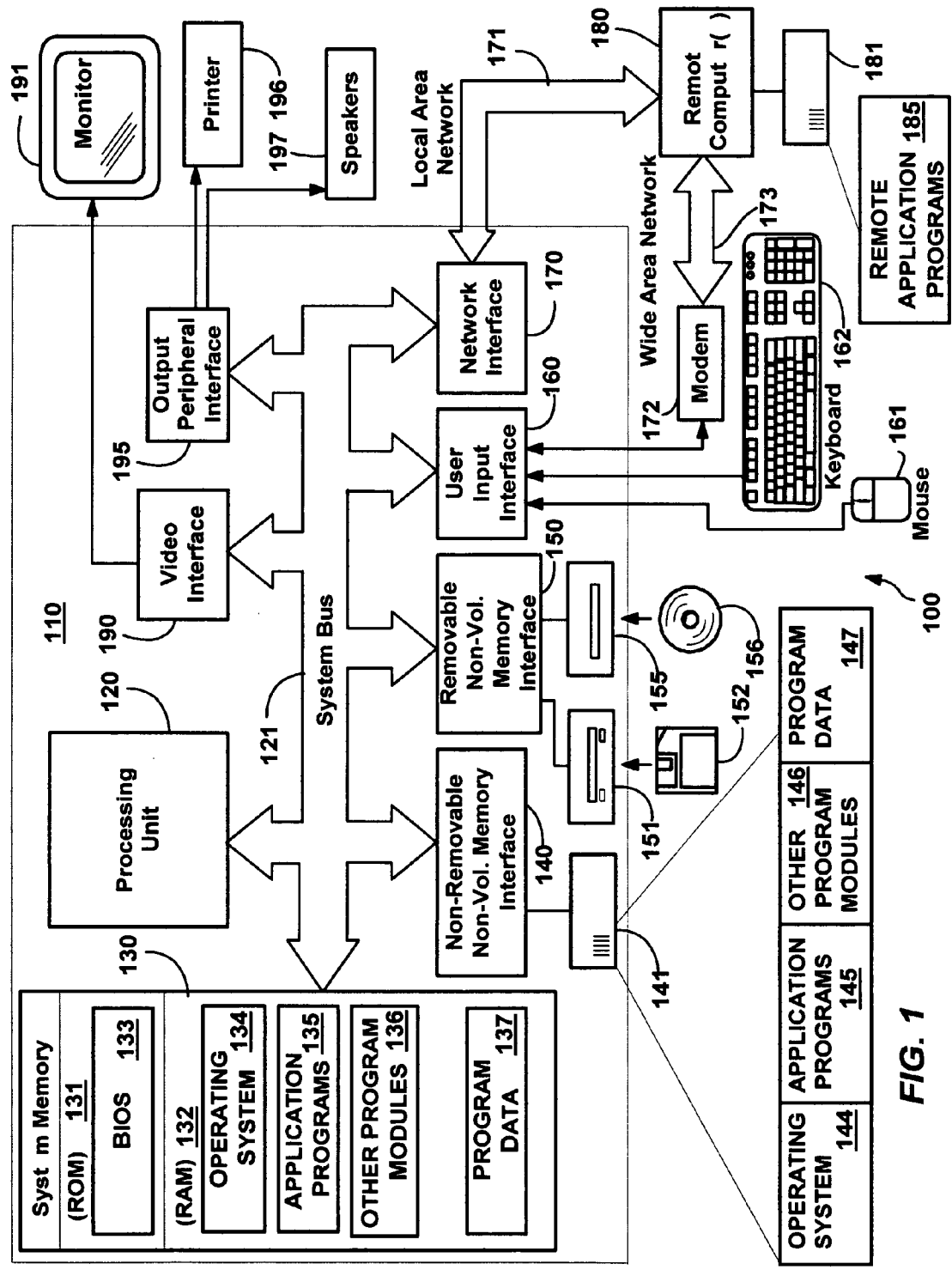
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Associating Source Code with Binary Code for use in Debugging

Figure 2:
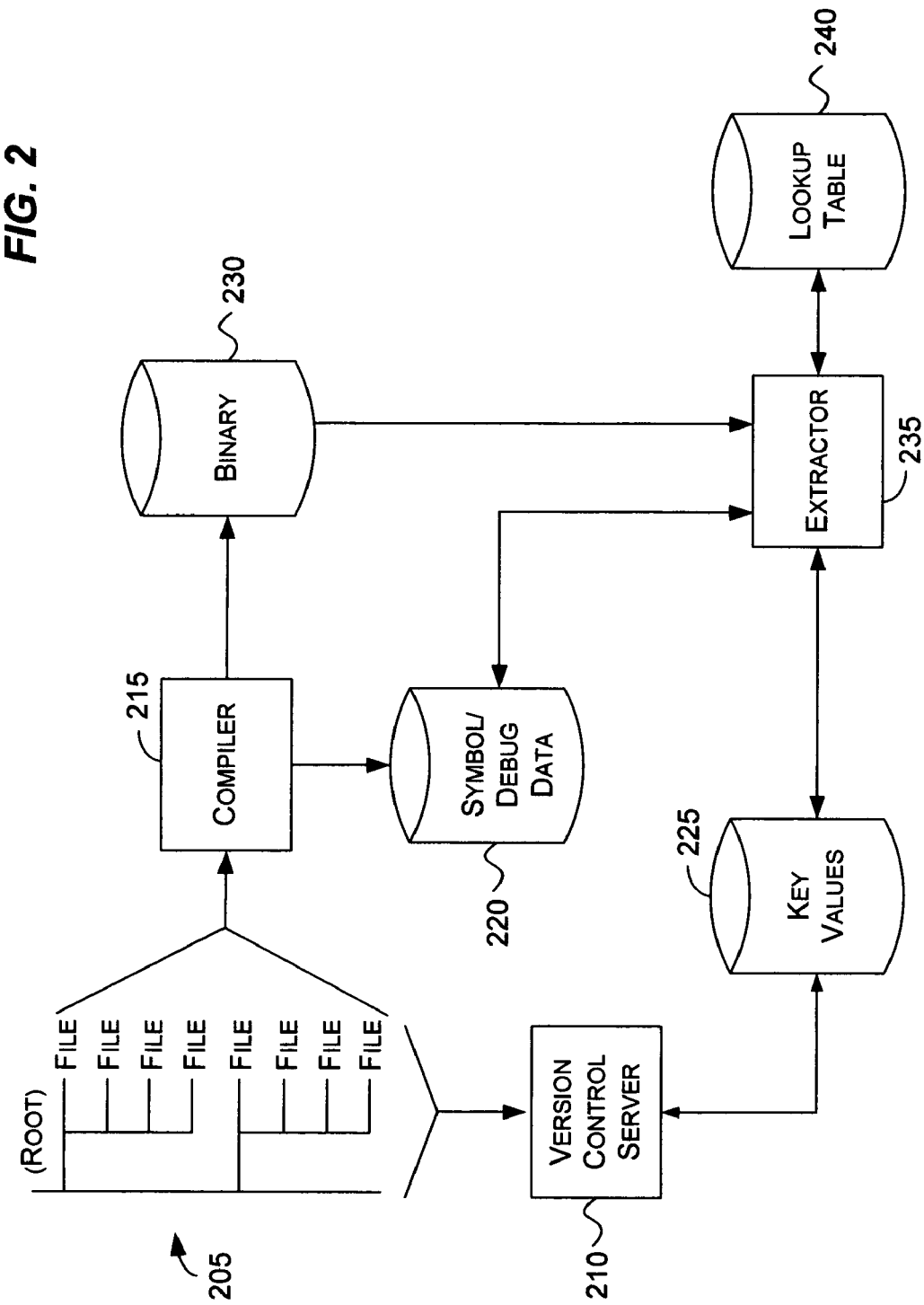
FIG. 2 is a block diagram representing a system for extracting information that may be used to associate source code with binary code in accordance with various aspects of the invention.

FIG. 2 is a block diagram representing a system for extracting information that may be used to associate source code with binary code in accordance with various aspects of the invention. The system includes a compiler 215, a version control server 210, and an extractor 235 together with storage for storing various files.

Source code files 205 are compiled by the compiler 215 into a binary 230 and a symbol/debug data 220. The extractor 235 executes during or after compilation of the binary 230. The extractor 235 extracts information that would be required to identify the source code files 205 to obtain them from the version control server 210. The extractor 235 obtains this information (represented as key values 225) from the version control server 210. The information may include the path to the file, the name of the file, and the version control system's version of the file. In one implementation, the information for each binary includes the name of a server upon which the version control server 210 executes, the port of the server at which the version control server 210 may be accessed, the paths to the source code files 205, and numeric values that indicate the versions of the files that were used in creating the binary. This information is then stored in the symbol/debug data 220 associated with the binary. In one implementation, the information is stored in program database (PDB) files. At debug time (which may occur months, minutes, seconds, or any time after compilation), a process retrieves the information from the symbol/debug data 220 and uses it to request the source code files from the version control server 210. The symbol/debug data 220 may be stored in a conventional file system, a database, a symbol server, or any other computer-accessible store without departing from the spirit or scope of the invention.

A version number of a file may take one of many forms. In one implementation, the version number is a numeric value associated with a version of a file. In another implementation, the version number is a time stamp associated with the version of the file used to create the binary. In another implementation, the version number is a text stamp or label. It will be recognized that any information suitable to identify the version of the source code file used to create the binary may be used without departing from the spirit or scope of the invention.

In extracting information to identify the source files to the version control server 210, the extractor 235 may create a lookup table 240. To create the lookup table 240, the extractor iterates the source code files 205 and obtains the key values 225 (from the version control server 210) for each of the files. Each set of key values may be thought of as unique identifier that identifies a source code file used to create the binary file. These key values 225 together with information identifying the local names of the files are placed in the lookup table 240. Then, the extractor 235 extracts from the binary 230 (or the symbol/debug data 220) the local file names for the source code used to create the binary 230. The entry for each source code file used to create the binary 230 is found in the lookup table 240 to obtain the key values. These key values are then injected into the symbol/debug data 220 for use in retrieving the corresponding source files at debug time.

The symbol/debug data 220 may include the types of variables, the names of the global variables, the names of the functions, information to correlate any given assembly instruction to a line of the source code file used to generate that assembly instruction, and/or other information. In some embodiments of the invention, the symbol/debug data 220 for each binary is merged with its corresponding binary.

It will be recognized that the information obtained from the version control system will vary depending on what version control system is used. In general, the information obtained is whatever information is needed to later request the source code files used to create the binary.

Figure 3:
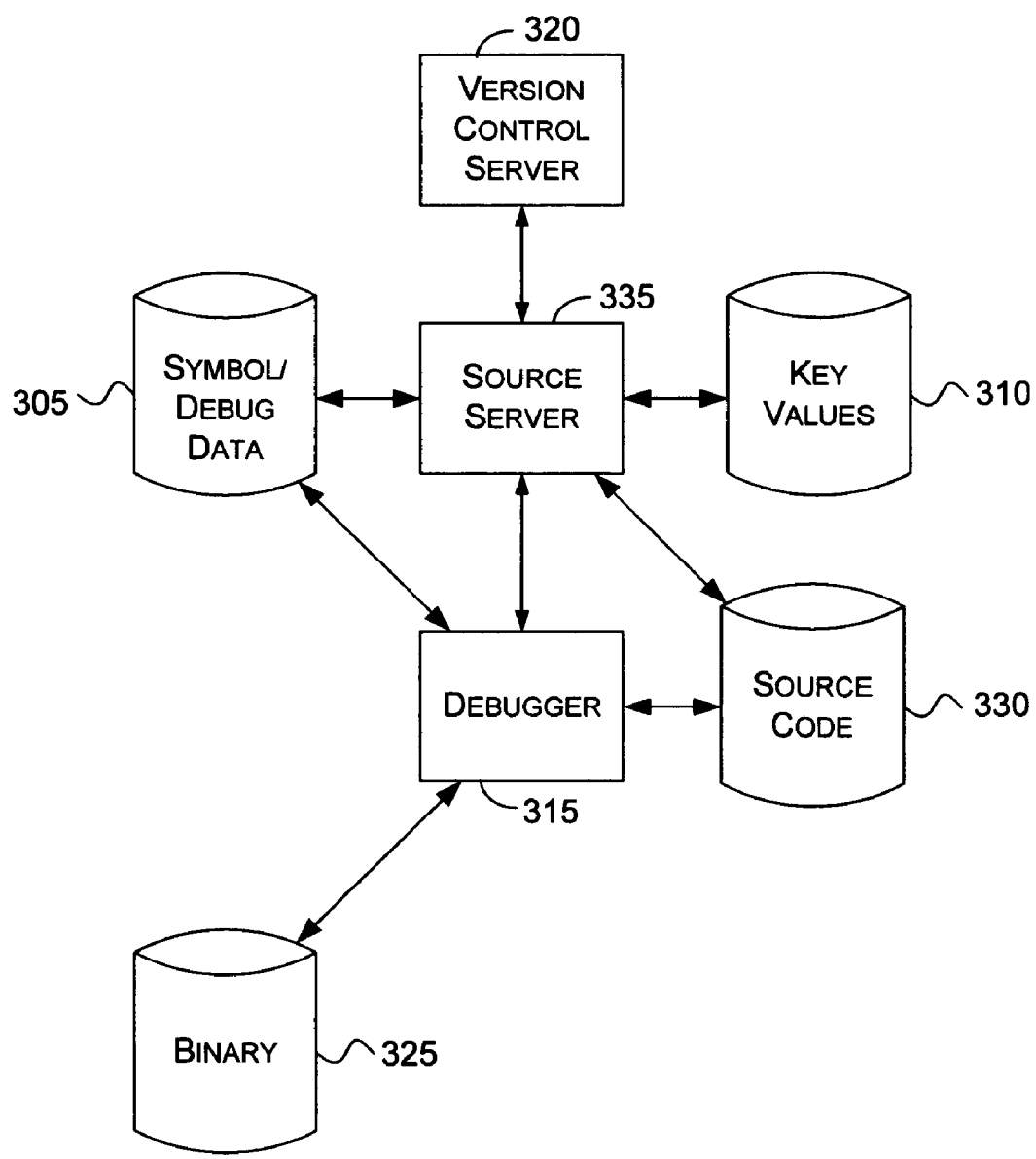
FIG. 3 is a block diagram representing a system for utilizing the extracted information of FIG. 2 at debug time in accordance with various aspects of the invention.

FIG. 3 is a block diagram representing a system for utilizing the extracted information of FIG. 2 at debug time in accordance with various aspects of the invention. A debugger 315 is instructed to debug a binary 325. The debugger 315 locates the symbol/debug data 305 associated with the binary 325. The symbol/debug data 305 may be contained in a PDB, for example. The debugger 315 calls the source server 335 which scans through the symbol/debug data 305 to obtain key values 310. The source server 335 then uses the key values 310 to request source code files from the version control server 320 and places copies of the source code files in a directory where the debugger 315 expects to find them. The debugger 315 then accesses the copies of the source code 330 and is able to correlate source code lines with binary instructions in the binary 325. Debugging may then proceed as usual with full source code support until another binary is selected at which time source code for the other binary may be found in the manner described above.

In some embodiments of the invention, the source server 335 is a component of the debugger 315. In other embodiments of the invention, the source server 335 is separate from the debugger 315. It will be recognized that the source server 335 may execute on the same device as the debugger 315 or elsewhere without departing from the spirit or scope of the present invention.

Figure 4:
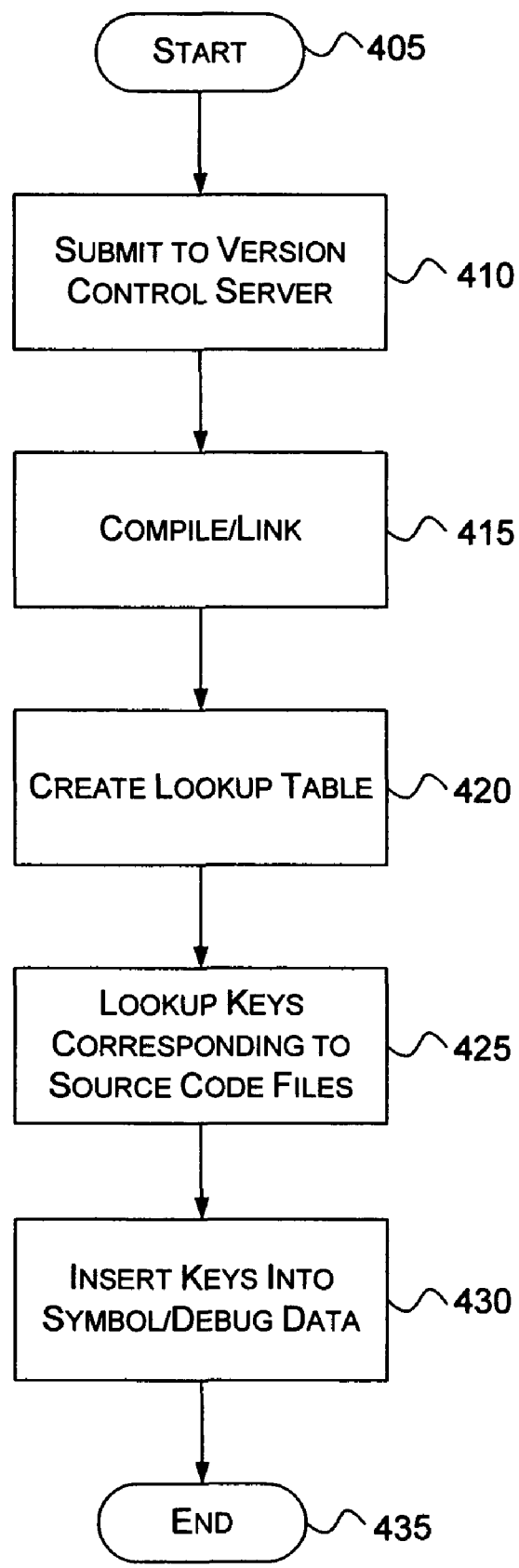
FIG. 4 is a dataflow diagram that generally represents exemplary steps that may occur in extracting information for later use at debug time in accordance with various aspects of the invention.

FIG. 4 is a dataflow diagram that generally represents exemplary steps that may occur in extracting information for later use at debug time in accordance with various aspects of the invention. The process begins at block 405.

At block 410, the source code files involved in generating the binary are submitted to the version control server. The version control server stores the files together with versioning information.

At block 415, the source code files are compiled and may be linked into an executable. At block 420, a lookup table is created. At block 425, the keys corresponding to the source code files used to create the binary are found in the lookup table. At block 430, the keys are inserted or appended into the symbol/debug data.

Figure 5:
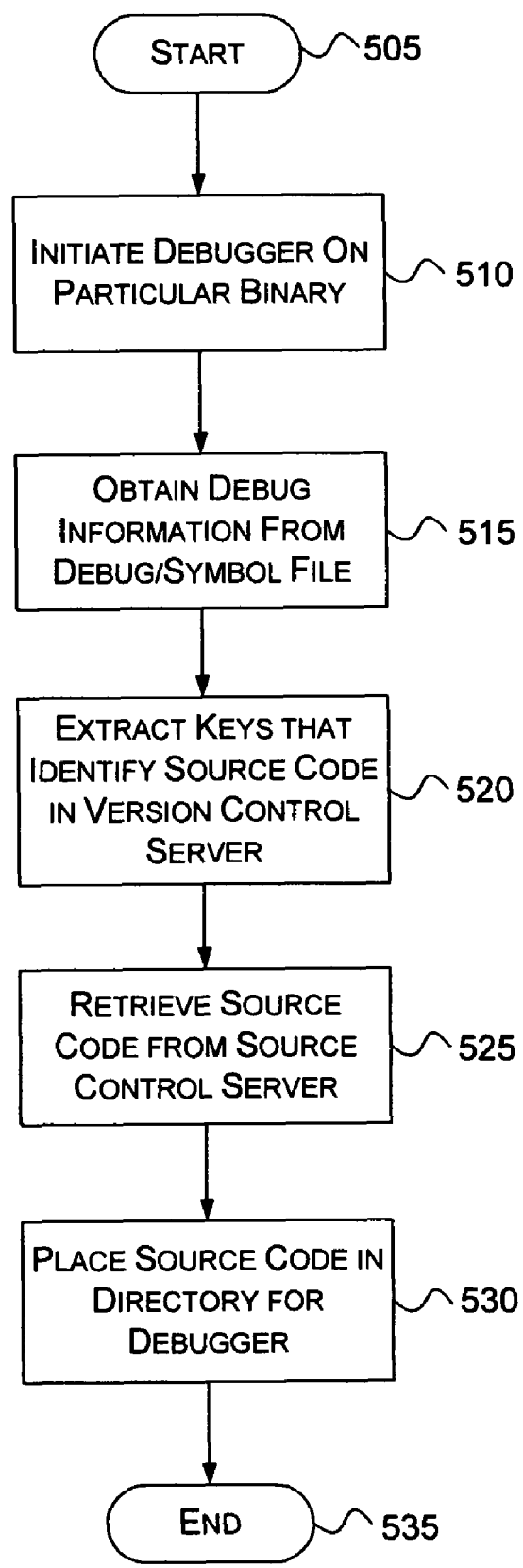
FIG. 5 is a dataflow diagram that generally represents exemplary steps that may occur at debug time in accordance with various aspects of the invention.

FIG. 5 is a dataflow diagram that generally represents exemplary steps that may occur at debug time in accordance with various aspects of the invention. The process begins at block 505.

At block 510, the debugger is launched and a binary is selected. At block 515, debug information pertaining to the selected binary is located. At block 520, keys that identify the source code used to create the binary is located in the debug information. At block 525, the source code is retrieved, using the keys, from a version control server. At block 530, the source code is placed in a directory for the debugger to use. At block 535, the process ends. At this point the debugger can step through the file with full source code support.

Following is an example of files and methods used to generate information to obtain source code files at debug time in accordance with various aspects of the invention. The example lists various files and their uses and then describes a process of using the files.

(1) Filename: foo.c
Use: The source code used to build foo.exe.

(2) Filename: foo.exe (Whatever Binary is being Built.)
Use: The binary this will be compiled from foo.c. This binary may later be loaded into a debugger.

(3) Filename: foo.pdb
Use: Debug information emitted by the compiler when the binary is built. This corresponds to the symbol/debug data 220 of FIG. 2.

(4) Filename: SrcSrv.ini
Example Line:
BAR_SERVER=bar.source.microsoft.com:4000

Use: Causes the text string on the right side of the equal sign to be replaced by the token on the left side of the equal sign. This is used to reduce the overall size of the stream data that will be written.

(5) Filename: SrcSrv.have
Example Line:
"z:\NT\examples\foo\foo.c"="//depot/bar/examples/foo/foo.c #3"
Use: Maps a local file name (left side) to a version control file name (right side). This is the equivalent of a lookup table, such as lookup table 240 of FIG. 2. Naturally, there may be many more lines as most software applications have many source code files associated with each binary.

(6) Filename: SrcSrv.srv
Example Line:
Z:\NT\examples=bar.source.microsoft.com:4000
Use: Maps a local directory structure (left side) to the version control server (right side) that is used to populate that directory.

(7) Filename: <None> (Done in Memory)
Example Line:
Z:\NT\examples\foo\foo.c
Use: Contains a list of all source files used to build a binary.

(8) Filename: <None> (Stream Data Written to Existing Debug Data File)
Example Stream:

```
SRCSRV: ini ------------------------------------------
VERSION=_
VERCTRL=Source Depot
DATETIME=Thu Dec 4 10:47:32 2003
SRCSRV: variables ------------------------------------
DEPOT=//depot
SDCMD=sd.exe –p %fnvar%(%var2%) print –o %srcsrvtrg% –q
%depot%/%var3%#%var4%
SDTRG=%targ%\%var2%\%fnbksl%(%var3%)\%var4%\%fnfile%
(%var1%)
SRCSRVTRG=%sdtrg%
SRCSRVCMD=%sdcmd%
BAR_SERVER=bar.source.microsoft.com:4000
SRCSRV: source files ---------------------------------
z:\NT\examples\foo\foo.c*BAR_SERVER*bar/examples/
foo/foo.c*3
SRCSRV: end ------------------------------------------
```

Use: This data allows the debugger extension to extract the original source files from the version control server.

Note that this particular stream is divided into a global variables area, a local variables area, and a source files area. The global variables begin after the SRCSRV: ini line, the local variables begin after the SRCSRV: variables line, and the source files area begins after the SRCSRV: source files line. A variable is assigned an expression or value by placing the variable name on the left hand side followed by an equal sign and then followed by an expression or value. Variables may be placed on the right hand side of an expression assigned to another variable by placing them between percent signs (%). During evaluation, each time a variable is found in an expression, the expression or value assigned to the variable is substituted for the variable name. This is done recursively until no variable names remain in the expression. Evaluation of a variable may cause an executable file to execute (e.g., sd.exe). The use of this method provides a short hand way of specifying file names and other information (e.g., through the use of variables).

Another benefit of the stream mechanism above is that the version control server used to retrieve source code files may be changed after the stream is written to the debug data area by changing the value assigned to BAR_SERVER, for example. Similarly, other information about source file may be changed after the stream is written to the debug data area by appropriately changing a variable or line in the stream. This may be done at a client (e.g., by changing an environment variable) or at a server (e.g., by changing the stream itself). It will be recognized that this provides a great deal of flexibility in retrieving source code files from other servers and into other directories. For example, a read-only server that mirrors the version control server may be assigned to serve the source code during debugging.

To place the information into the symbol/debug data, the following steps occur.

A software developer, organization, or process provides (1) and (4). The compiler compiles (1) and produces (2) and (3). Using the files provided in (1), an extractor produces (5) and (6). The extractor produces a list (7) of all the source files used to build the binary and stores the list in memory. Then, (3), (4), (5), (6), and (7) are used to create a stream (8) that is placed in a debug file such as symbol/debug data 220 of FIG. 2. At debug time, the stream is extracted from the debug file and used to obtain the source files associated with the binary.

The present invention is not limited to debugging source code. Aspects of the present invention may also be used by tools that analyze changes in binaries. Such tools, for example, may use aspects of the invention to call up the appropriate source files for comparison of changes to source code. Tools that look at testing code coverage may use aspects of the invention to show the appropriate source lines. Furthermore, the information that associates source code files to binaries may be used by tools to call the version control server directly so other information about the source can be learned such as when the code was checked in to the system.

It will also be recognized that the present invention may be practiced over any network, including the Internet, and may use any appropriate protocol, such as TCP/IP or HTTP, without departing from the spirit or scope of the invention.

As can be seen from the foregoing detailed description, there is provided an improved method and system for associating source code with the binary code it generates, particularly at debug time. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions stored thereon that, when executed by a processor, implement a method for associating original source code with binary code for debugging the binary code, the method comprising:

storing source code files on a server, the source code files including source code and being associated with a version;

compiling a source code file into a binary file;

while compiling the source code file, extracting information that identifies a location of the source code file, the version associated with the source code file, a name of the server, a port of the server at which the server may be accessed to access the source code, a path to the source code, and a numeric value that indicates a version number of the source code;

storing the extracted information in a debug file associated with the binary file, wherein storing the extracted information includes storing the debug file with information forming at least a portion of a data stream, wherein the data stream is divided into the following:
  a first one or more lines defining a global variables area;
  a second one or more lines defining a local variables area; and
  a third one or more lines defining a source files area;
after compiling the source code file, receiving an instruction for a debugger to debug the binary file;
after receiving the instruction for the debugger, using the extracted information stored in the debug file, locating the source code file and associate it with the binary file; and
thereafter debugging the binary file with full source code support by correlating lines of the source code file with binary instructions in the binary file, the source code file including only the source code originally used to compile the binary file.

2. The computer-readable storage medium of claim 1, further comprising:
  extracting the information from the debug file;
  requesting the source code associated with the version from the server via the information;
  placing the source code in a directory used by a debugger to debug an executable code; and
  executing the debugger and matching an instruction in the executable code to an instruction in the source code.

3. The computer-readable medium of claim 2, wherein placing the source code in a directory used by the debugger to debug the executable code is performed after launching the debugger, wherein the data stream includes variables as shorthand expressions requiring an extractor substitute the variables with an expression or value identifying information necessary for retrieval of the source code file, and wherein the method further includes:
  merging the debug file with the binary file.

4. The computer-readable storage medium of claim 1, wherein the source code file includes programming statements which, when compiled, produce executable code in the form of the binary file.

5. The computer-readable storage medium of claim 1, wherein the server comprises a version control server that stores a plurality of versions of the source code.

6. The computer-readable storage medium of claim 1, wherein the binary file includes code that was compiled from a plurality of source code files, each source code file associated with a version.

7. The computer-readable storage medium of claim 6, further comprising obtaining additional information that identifies the versions associated with the plurality of source code files to the server and storing the additional information in the debug file.

8. The computer-readable storage medium of claim 1, wherein the debug file comprises a program database file that is separate from an executable code.

9. The computer-readable storage medium of claim 1, wherein the debug file comprises a portion of an executable file that includes an executable code.

10. The computer-readable storage medium of claim 1, further comprising
  iterating each source code file that is part of a compilation, each source code file having a version;
  obtaining information that identifies the version of each source code file to the server and a local name of each source code file;
  storing the information in a lookup table; and
  extracting, from the binary file, local names of the source code files that were used in compiling the binary file; and
  for each source code file that was used in compiling the binary file, looking up the version in the lookup table by using the local name of the source code file.

11. The computer-readable medium of claim 1, wherein each of the global variables area, local variables area, and source files area are separated by a respective SRCSRV: line.

12. The computer-readable medium of claim 1, the data stream defines substitute variables for expressions, and wherein each of the global variables area, local variables area, and source files area has a variable assigned to an expression by separating each variable and each expression with an equal sign.

13. A system for associating original source code with binary code for debugging the binary code, comprising:
  having a processor executing computer-executable instructions
  a compiler arranged to compile source code files into a binary file and to generate debug data, source code files including source code and being associated with a version;
  a version control server arranged to store versions of the source code files;
  an extractor arranged to operate in parallel with the compiler and extract information that identifies a location of the source code, the version of each source code file used to create the binary file, and key values that include at least a name of the version control server, a port of the version control server at which the version control server may be accessed to access the source code files, a path or paths to the source code files, and a plurality of numeric values, each numeric value indicating a version number of a corresponding source code file, wherein the extractor is further arranged to store the extracted information in a debug file for use in retrieving the source code files at a debug time, wherein storing the extracted information includes storing the debug file with information forming at least a portion of a data stream, wherein the data stream is divided into the following:
    a first one or more lines defining a global variables area;
    a second one or more lines defining a local variables area; and
    a third one or more lines defining a source files area; and
  a debugger arranged to, after compiling of the source code, receive an instruction to debug the binary file and use the extracted information stored in the debug file to locate the source code file and associate it with the binary file, and thereafter debug the binary file with full source code support by correlating lines of the source code file with binary instructions in the binary file, the source code file including only the source code originally, used to compile the binary file.

14. The system of claim 13, further comprising a source server arranged to extract the information at debug time, retrieve the source code files from the version control server, and place the source code files in a directory accessible by the debugger.

15. The system of claim 14, wherein the source server comprises a component of the debugger.

16. The system of claim 14, wherein the source server is separate from the debugger.

17. The system of claim 16, wherein the debugger is arranged to find the source code files in the directory and is unaware of the version control server.

* * * * *

UNITED STATES PATENT AND TRADEMARK OFFICE
CERTIFICATE OF CORRECTION

PATENT NO. : 7,730,451 B2
APPLICATION NO. : 10/747659
DATED : June 1, 2010
INVENTOR(S) : Pat Styles et al.

It is certified that error appears in the above-identified patent and that said Letters Patent is hereby corrected as shown below:

In column 10, lines 13-16, in Claim 13, delete "A system for associating original source code with binary code for debugging the binary code, comprising: having a processor executing computer-executable instructions" and insert -- A system having a processor executing computer-executable instructions for associating original source code with binary code for debugging the binary code, comprising: --, therefor.

In column 10, line 51, in Claim 13, delete "originally," and insert -- originally --, therefor.

Signed and Sealed this
Fifteenth Day of February, 2011

David J. Kappos
*Director of the United States Patent and Trademark Office*